United States Patent
Park (10) Patent No.: US 8,701,805 B2
(45) Date of Patent: Apr. 22, 2014

(54) MOTOR HAVING ROTORS ARRANGED CONCENTRICALLY AND DRIVING APPARATUS HAVING THE MOTOR

(76) Inventor: Gye-Jeung Park, Daegu (KR)

( * ) Notice: Subject to any disclaimer, the term of this patent is extended or adjusted under 35 U.S.C. 154(b) by 1098 days.

(21) Appl. No.: 12/596,595

(22) PCT Filed: Apr. 17, 2008

(86) PCT No.: PCT/KR2008/002182
§ 371 (c)(1),
(2), (4) Date: Oct. 19, 2009

(87) PCT Pub. No.: WO2008/130139
PCT Pub. Date: Oct. 30, 2008

(65) Prior Publication Data
US 2010/0139999 A1 Jun. 10, 2010

(30) Foreign Application Priority Data

Apr. 18, 2007 (KR) ............... 10-2007-0038016
Nov. 5, 2007 (KR) ............... 10-2007-0111842

(51) Int. Cl.
*B60K 1/00* (2006.01)
(52) U.S. Cl.
USPC ........................ 180/65.51; 310/424
(58) Field of Classification Search
USPC ........ 180/65.51; 310/424, 418, 428, 422, 425
See application file for complete search history.

(56) References Cited

U.S. PATENT DOCUMENTS

| | | | | |
|---|---|---|---|---|
| 5,541,463 A | * | 7/1996 | Ellzey, Jr. | 310/216.015 |
| 5,600,191 A | * | 2/1997 | Yang | 310/67 R |
| 5,632,157 A | * | 5/1997 | Sekino et al. | 62/244 |
| 5,783,893 A | * | 7/1998 | Dade et al. | 310/266 |
| 5,894,902 A | * | 4/1999 | Cho | 180/65.51 |
| 6,278,216 B1 | * | 8/2001 | Li | 310/424 |
| 6,380,653 B1 | * | 4/2002 | Seguchi | 310/112 |
| 6,445,098 B1 | * | 9/2002 | Materne | 310/89 |
| 6,836,035 B1 | * | 12/2004 | Pawletko | 310/49.08 |
| 7,262,536 B2 | * | 8/2007 | Rahman et al. | 310/156.35 |
| 7,472,770 B2 | * | 1/2009 | Tomoshige et al. | 180/65.51 |

(Continued)

FOREIGN PATENT DOCUMENTS

| | | |
|---|---|---|
| JP | 05-146121 | 6/1993 |
| JP | 2005-112583 | 4/2005 |
| KR | 10-1994-0022985 | 10/1994 |
| KR | 10-2003-0050734 | 6/2003 |

*Primary Examiner* — Jeffrey J Restifo
(74) *Attorney, Agent, or Firm* — IPLA P.A.; James E. Bame (57) ABSTRACT

The present invention relates to a motor having yokes concentrically arranged and a driving apparatus having the motor. More particularly, the present invention relates to a motor, in which armature metal cores having coils wound thereon and yokes having magnets attached thereto are arranged in multiple stages around a central shaft, and a driving apparatus having the motor. A motor having yokes concentrically arranged according to an aspect of the present invention comprises a rotor and a stator. The rotor has a plurality of cylindrical yokes arranged in multiple stages in a radial direction and a plurality of magnets respectively fixed to the yokes with polarities of the magnets alternated with each other in a circumferential direction. The stator has armature metal cores arranged to face the respective yokes and a plurality of armature coils wound on the armature cores to face the magnets. A driving apparatus according to another aspect of the present invention comprises the aforementioned motor, a brake disk, and a caliper. The brake disk is fixedly coupled to the rotor of the motor. The caliper is installed to one side of the brake disk to restrain the brake disk from rotating.

7 Claims, 13 Drawing Sheets

(56) References Cited

U.S. PATENT DOCUMENTS

| | | | |
|---|---|---|---|
| 7,535,143 B2 * | 5/2009 | Romagny et al. | 310/114 |
| 7,592,733 B2 * | 9/2009 | Naitou et al. | 310/216.058 |
| 7,663,274 B2 * | 2/2010 | Kataoka et al. | 310/68 R |
| 7,663,287 B2 * | 2/2010 | Haga et al. | 310/260 |
| 7,671,502 B2 * | 3/2010 | Tajima et al. | 310/156.53 |
| 7,950,484 B2 * | 5/2011 | Moriguchi et al. | 180/65.51 |
| 7,982,356 B2 * | 7/2011 | Buban | 310/216.113 |
| 8,006,789 B2 * | 8/2011 | Dial | 180/65.51 |
| 8,132,636 B2 * | 3/2012 | Suzuki | 180/65.51 |
| 8,136,790 B2 * | 3/2012 | Hoppe et al. | 251/129.15 |
| 2009/0025991 A1 * | 1/2009 | Moriguchi et al. | 180/65.5 |
| 2010/0139999 A1 * | 6/2010 | Park | 180/65.51 |
| 2011/0058963 A1 * | 3/2011 | Horng | 417/353 |

* cited by examiner

MOTOR HAVING ROTORS ARRANGED CONCENTRICALLY AND DRIVING APPARATUS HAVING THE MOTOR

TECHNICAL FIELD

The present invention relates to a motor having yokes concentrically arranged and a driving apparatus having the motor. More particularly, the present invention relates to a motor, in which armature metal cores having coils wound thereon and yokes having magnets attached thereto are arranged in multiple stages around a central shaft, and a driving apparatus having the motor. The present invention may be applied to a hub type where the shaft is fixed and a housing of the motor rotates, or a type where the housing is fixed and the shaft rotates, depending on its usage.

BACKGROUND ART

Due to the environmental effects caused by air pollution and exhaustion of fossil fuels, a driving apparatus using an electric motor is highlighted. Thus, a hybrid vehicle using an engine as a main power source and an electric motor as an auxiliary power source has been developed and commercialized. Further an electric vehicle using an electric motor as a main power source is under development. In this reason, an electric motor providing higher output is more demanded.

Figure 16:
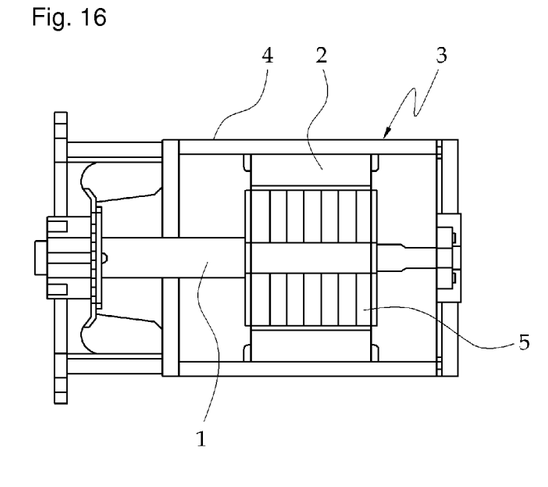
FIG. 16 is a schematic view of a conventional motor.

FIG. 16 is a schematic view of a conventional motor. A conventional motor includes a central shaft 1, a stator 5 and a rotor 3. The rotor 3 includes a yoke 4 and permanent magnets 2 fixed to the yoke 4 and is rotatably coupled with a central shaft 1 by means of a bearing. The permanent magnets 2 are coupled with the yoke 4 with opposite polarities.

The stator 5 is formed by winding a coil around an armature metal core and fixedly coupled to the central shaft 1. Also, if an electric current is supplied to the coil, a magnetic field is generated around the coil. Thus, the magnetic field generated around the coil interacts with a magnetic field of the permanent magnet 2 to generate magnetomotive force, and the magnetomotive force causes the rotor 3 to rotate about the central shaft 1.

DISCLOSURE OF INVENTION

Technical Problem

In the conventional motor, each of the permanent magnet and the coil is configured in one stage. Thus, the motor should have a large volume to provide sufficient output power. If the motor has a small volume, the motor provide very small magnetomotive force to thereby give small torque. Thus, since a vehicle using such a motor cannot give high output power, there is a problem in that it is difficult to decrease the weight of a vehicle.

In addition, an additional pad disk is required for employing the conventional motor in a driving apparatus. That is, a brake disk of the driving apparatus should be coupled to the pad disk, and the pad disk should be coupled to a housing of the conventional motor. In this case, since an additional pad disk should be prepared, there is a problem in that a process for manufacturing a pad disk is needed, which increases a production cost.

Technical Solution

A motor having yokes concentrically arranged according to an aspect of the present invention for achieving the objects comprises a rotor and a stator. The rotor has a plurality of cylindrical yokes arranged in multiple stages in a radial direction and a plurality of magnets respectively fixed to the yokes with polarities of the magnets alternated with each other in a circumferential direction. The stator has armature metal cores arranged to face the respective yokes and a plurality of armature coils wound on the armature cores to face the magnets. The yokes and the armature metal cores are arranged in multiple stages in the radial direction, the motor can have a small volume and provide great output power.

In addition, in the motor according to the present invention, the rotor preferably further includes a fixed shaft positioned at a rotation center of the rotor. The rotor further has a rotating disk for rotatably coupling the respective yokes to the fixed shaft. The stator further has a fixed disk for fixedly coupling the armature metal cores to the fixed shaft. Thus, it is possible to implement the motor in which a housing rotates.

Further, in the motor having the fixed shaft, it is preferred that the armature metal cores positioned between the yokes be detachably coupled to the fixed disk. Since the armature metal core is detachably coupled to the fixed disk, the motor can be easily assembled.

Furthermore, in the motor having the fixed shaft, it is preferred that the armature metal core positioned inside of the innermost yoke be fixedly coupled to the fixed shaft.

Also, in the motor having the fixed shaft, the yoke positioned between the armature metal cores may be detachably coupled to the rotating disk. In this case, the motor can be easily assembled.

In addition, in the motor having the fixed shaft, the respective yokes may be formed by extending one surface of the rotating disk. In this case, since the respective yokes are formed integrally with the rotating disk, it is possible to eliminate an assembling error between the yokes and the rotating disk. Thus, gaps between the yokes and the armature metal core can be more precisely narrowed, whereby output power of the motor can be enhanced.

Further, in the motor having the fixed shaft, it is preferred that a brake disk be detachably coupled to the other surface of the rotating disk. Since the brake disk is coupled directly to the other surface of the rotating disk, it is possible to eliminate a pad disk used for coupling of the brake disk.

In addition, in the motor having the fixed shaft, the respective yokes may be inserted into and fixed to one surface of the rotating disk, and the rotor may further have a cylindrical housing formed by extending an end of the rotating disk in an axial direction to surround an outer circumferential surface of the outermost yoke in the radial direction. In this case, the yoke is be made of steel and the rotating disk and the housing cylinder are made of a light metal such as aluminum, so that it is possible to decrease the weight of the motor.

Also, in the motor having the fixed shaft, it is preferable that a brake disk be detachably coupled to the other surface of the rotating disk.

In addition, in the motor having the fixed shaft, it is preferred that the motor further comprise a rim extending from an outer circumferential surface of the cylindrical housing so that a tire is mounted to the rim.

Further, the motor may further include a rotating shaft positioned at a rotation center of the rotor. In this case, the rotor further has a rotating disk for fixedly coupling the respective yokes to the rotating shaft. In addition, the stator further has a fixed disk for rotatably coupling the armature metal cores to the rotating shaft. Thus, it is possible to implement the motor in which the housing is fixed and the shaft rotates.

In addition, in the motor having the rotating shaft, it is preferable that the armature metal cores be detachably coupled to the fixed disk. Thus, the motor can be assembled more easily.

Also, in the motor having the rotating shaft, the yoke positioned between the armature metal cores may be detachably fixed to the rotating disk. Since the yoke is detachable from the rotating disk, the motor can be assembled more easily.

In addition, in the motor having the rotating shaft, it is preferable that the innermost yoke be fixedly coupled to the rotating shaft.

Also, in the motor having the rotating shaft, the respective yokes may be formed by extending one surface of the rotating disk. In this case, the yokes and the rotating disk are integrally formed, so that it is possible to eliminate an assembling error between the yokes and the rotating disk.

In addition, in the motor having the rotating shaft, the respective yokes may be inserted into and fixed to one surface of the rotating disk, and the rotor may further have a cylindrical housing formed by extending an end of the rotating disk in an axial direction to surround an outer circumferential surface of the outermost yoke in the radial direction. In this case, since the yoke is made of steel and the rotating disk and the housing cylinder are made of a light metal such as aluminum, it is possible to decrease the weight of the motor.

Further, in the motor having the rotating shaft, it is preferred that the motor further comprise a rim extending from an outer circumferential surface of the cylindrical housing so that a tire is mounted to the rim.

A driving apparatus according to another aspect of the present invention comprises the aforementioned motor, a brake disk, and a caliper. The brake disk is fixedly coupled to the rotor of the motor. The caliper is installed to one side of the brake disk to restrain the brake disk from rotating.

In addition, in the driving apparatus, the caliper is preferably fixed to one side of the fixed shaft.

EXPLANATION OF REFERENCE NUMERALS FOR MAJOR PORTIONS SHOWN IN DRAWINGS

10: Fixed shaft
20: Rotor
21: First yoke
23: Second yoke
25: First magnet
27: Second magnet
29: Third magnet
31: Rotating disk
33: Bearing
35: Bolt
40: Stator
41: Pair of armature metal cores
43: Third armature metal core
45: First armature coil
47: Second armature coil
49: Third armature coil
51: Fixed disk
53: Bolt
55: Brake disk
57: Caliper
60: Motor
61: Rim
210: Fixed shaft
220: Rotor
221: Yoke
223: Yoke
225: First magnet
227: Second magnet
229: Third magnet
231: Rotating disk
236: Coupling hole
240: Stator
241: First armature metal core
243: Second armature metal core
245: First armature coil
247: Second armature coil
249: Third armature coil
251: Fixed disk
255: Brake disk
257: Caliper
259: Bolt
260: Motor
261: Rim
263: Tire
310: Fixed shaft
320: Rotor
321: First yoke
323: Second yoke
325: First magnet
327: Second magnet
329: Third magnet
331: Rotating disk
336: Coupling hole 340: Stator
341: First armature metal core
343: Second armature metal core
355: Brake disk
357: Caliper
359: Bolt
360: Motor
361: Rim
363: Tire

BEST MODE FOR CARRYING OUT THE INVENTION

First of all, an embodiment of a motor according to the present invention will be described.

Figure 1:
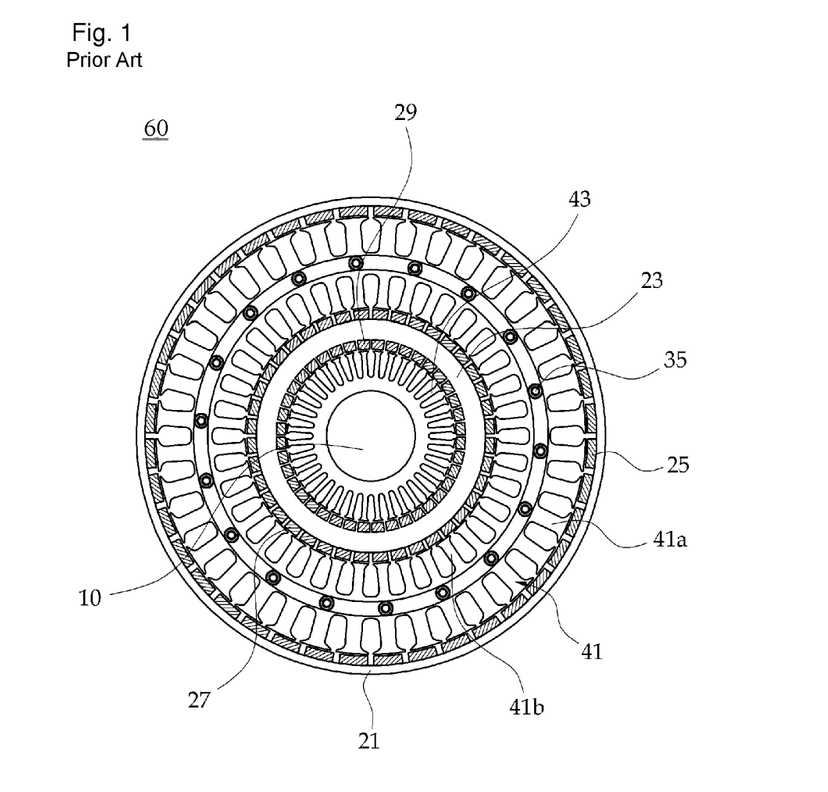
FIG. 1 is a front sectional view of an embodiment of a motor having yokes concentrically arranged according to the present invention.
Figure 2:
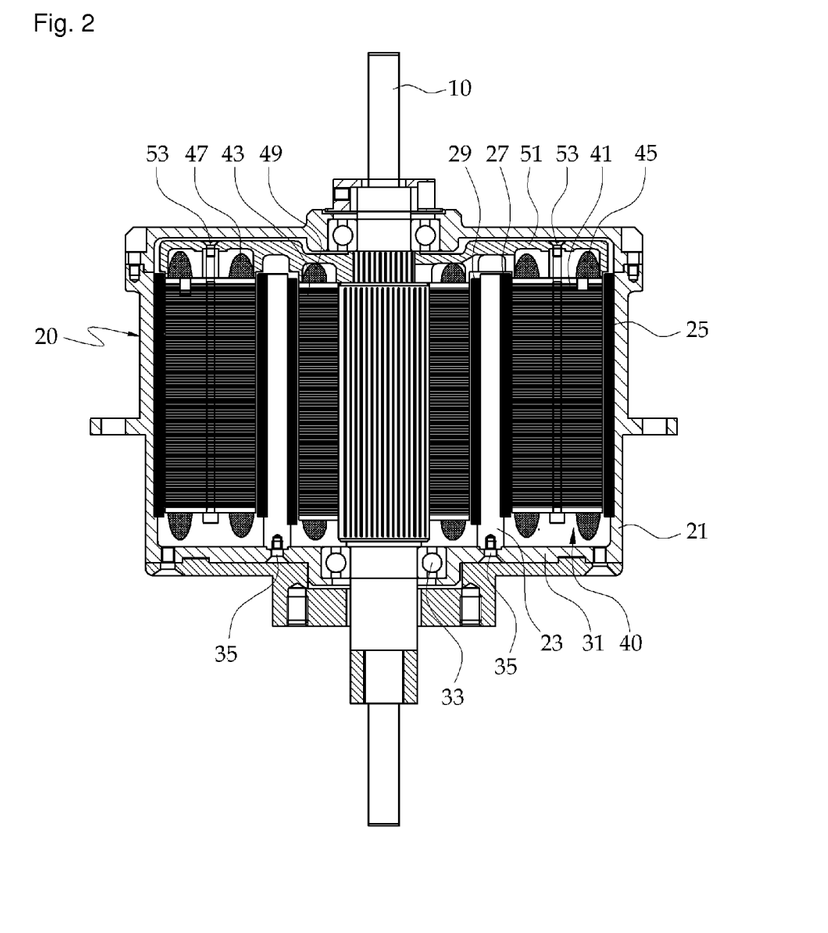
FIG. 2 is a side sectional view of the embodiment shown in FIG. 1.

FIG. 1 is a front sectional view of an embodiment of a motor having yokes concentrically arranged according to the present invention, and FIG. 2 is a side sectional view of the embodiment shown in FIG. 1.

A motor 60 shown in FIG. 1, which is a type having a rotating housing, includes a fixed shaft 10, a rotor 20 and a stator 40.

The rotor 20 includes yokes 21 and 23, magnets 25, 27 and 29 and a rotating disk 31. The rotating disk 31 is rotatably coupled to a fixed shaft 10 by a bearing 33. The yokes 21 and 23 have a cylindrical shape and are arranged in two stages in a radial direction. That is, the yokes are composed of the first yoke 21 with a larger diameter and the second yoke 23 with a smaller diameter. Also, one side of each yoke 21 or 23 is coupled with one surface of the rotating disk 31. At this time, the first yoke 21 is formed by extending a circumference of the rotating disk 31, and the second yoke 23 is detachably coupled to the rotating disk 31 by means of bolts 35. The yokes 21 and 23 may also be arranged in two or more stages in other embodiments. The magnets are composed of the first magnets 25, the second magnets 27 and the third magnets 29. The plurality of first magnets 25 are fixed to an inner circumferential surface of the first yoke 21 along a circumferential direction, the plurality of second magnets 27 are fixed to an outer circumferential surface of the second yoke 23 along the circumferential direction, and the plurality of third magnets 29 are fixed to an inner circumferential surface of the second yoke 23 along the circumferential direction. Forty of the first, second or third magnets 25, 27 or 29 are fixed at regular intervals along the circumferential direction of the yokes 21 or 23 such that the polarities of the magnets are alternated with each other. Although the number of the first, second or third magnets 25, 27 or 29 is forty polarities in this embodiment, the number thereof may vary, for example, thirty-six. Also, in this embodiment, the magnets 25, 27 and 29 are fixed to be spaced apart from each other at regular intervals on the circumferential surfaces of the yokes 21 and 23, but they may be fixed continuously without any gap.

The stator 40 includes a fixed disk 51, armature metal cores 41 and 43, and armature coils 45, 47 and 49. The fixed disk 51 is fixed to the fixed shaft 10. The armature metal cores are composed of the first armature metal core 41 and the second armature metal core 43. The first armature metal core 41 is disposed between the first yoke 21 and the second yoke 23, and detachably fixed to one surface of the fixed disk 51 by means of bolts 53. Also, grooves are formed in an outer side 41a and an inner side 41b of the first armature metal core 41 such that the first and second armature coils 45 and 47 are wound thereon, respectively. The second armature metal core 43 is disposed inside of the second yoke 23 and fixed to the fixed shaft 10. In addition, grooves are formed in an outer side of the second armature metal core 43 such that the third armature coil 49 is wound thereon. The armature metal cores 41 and 43 are formed by laminating thin silicon steel plates in order to allow magnetic force line to easily pass and to reduce eddy current. The armature coils are composed of the first armature coil 45, the second armature coil 47 and the third armature coil 49. The first armature coil 45 is wound on the grooves formed in the outer side 41a of the first armature metal core 41 so as to face the first magnet 25. The second armature coil 47 is wound on the grooves formed in the inner side 41b of the first armature metal core 41 so as to face the second magnet 27. The third armature coil 49 is wound on the grooves formed in the outer side of the second armature metal core 43 so as to face the third magnet 29. The armature coils 45, 47 and 49 may be connected in series or in parallel, and either wiring or Y wiring may be employed therein.

When electric current is supplied to the armature coils 45, 47 and 49, magnetic fields are generated. The magnetic fields generated by the armature coils 45, 47 and 49 interact with the magnetic fields generated by the magnets 25, 27 and 29, thereby generating rotating force. Thus, the rotor 20 makes a rotation around the fixed shaft 10. Meanwhile, the motor 60 may also be used as a power generator. That is, if the rotor 20 rotates, the induced current is generated in the armature coils 45, 47 and 49 due to the magnets 25, 27 and 29 fixed to the rotor 20.

Figure 5:
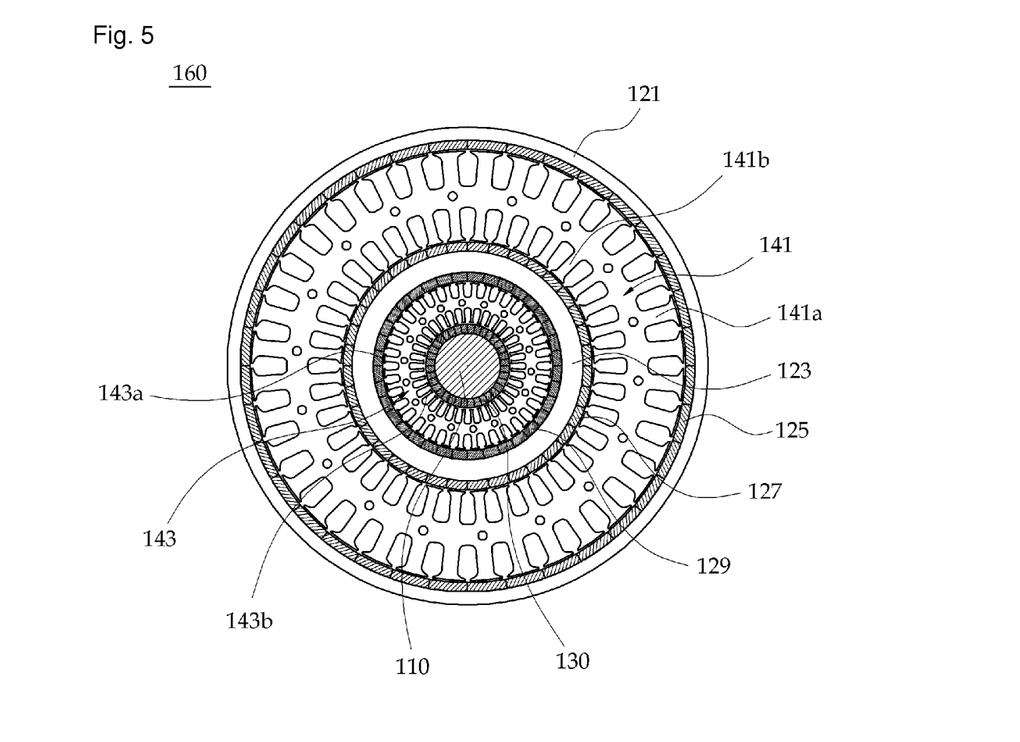
FIG. 5 is a front sectional view of another embodiment of the motor having the yokes concentrically arranged according to the present invention.
Figure 6:
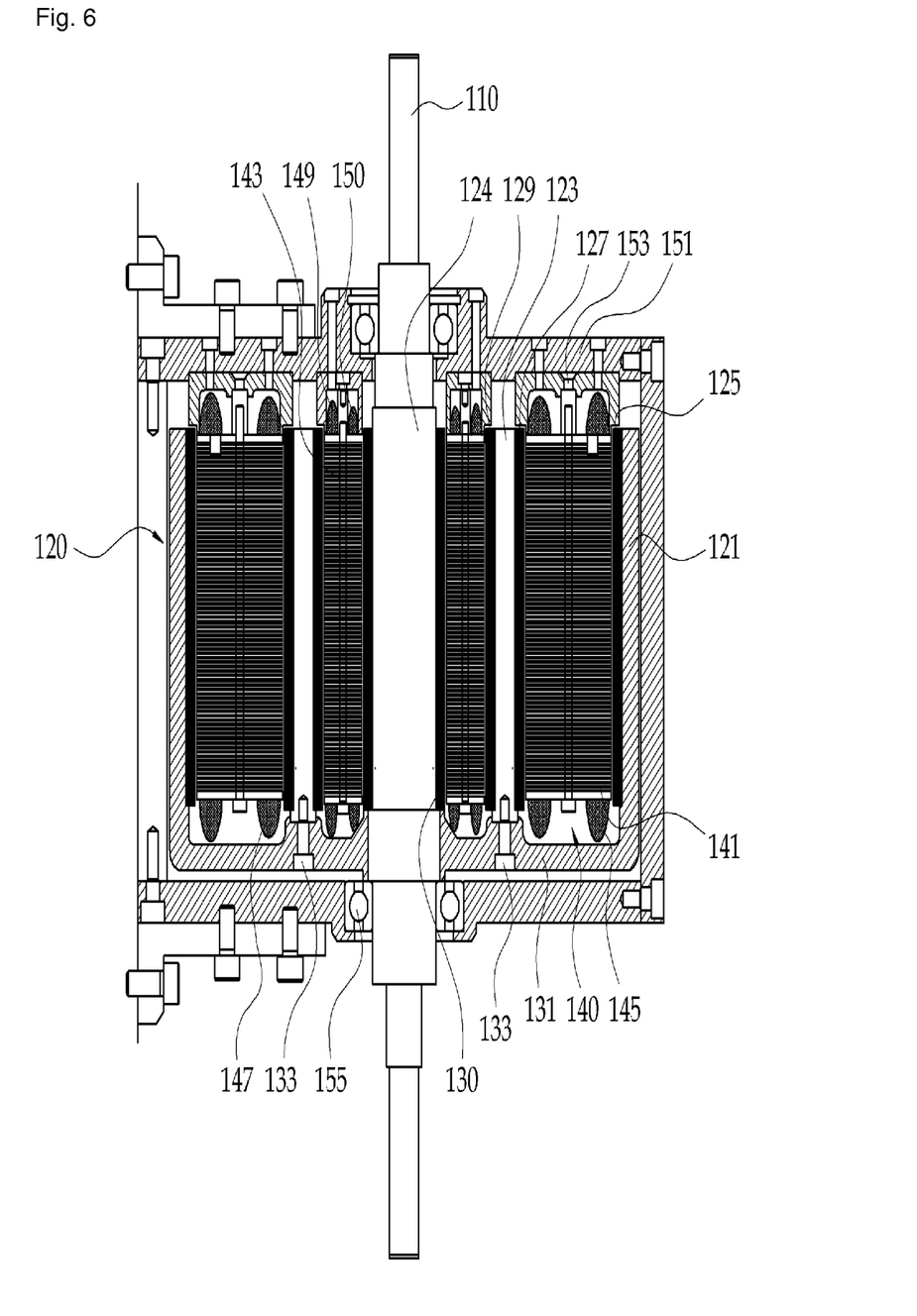
FIG. 6 is a side sectional view of the embodiment shown in FIG. 5.

FIG. 5 is a front sectional view of another embodiment of the motor having the yokes concentrically arranged according to the present invention, and FIG. 6 is a side sectional view of the embodiment shown in FIG. 5.

The motor shown in FIG. 5, which is a type having a rotating shaft, includes a rotating shaft 110, a rotor 120 and a stator 140.

The rotor 120 includes a rotating disk 131, yokes 121, 123 and 124, and magnets 125, 127, 129 and 130. The rotating disk 131 is fixed to the rotating shaft 110. The yokes 121, 123 and 124 are arranged in a radial direction. The yokes are composed of the first yoke 121, the second yoke 123, and the third yoke 124 according to their radii. The first yoke 121 is formed by extending a circumferential surface of the rotating disk 131. The second yoke 123 is detachably coupled to one surface of the rotating disk 131 by means of bolts 133 in the first yoke 121. The third yoke 124 is formed integrally with the rotating shaft 110.

The magnets are composed of the first magnets 125, the second magnets 127, the third magnets 129 and the fourth magnets 130 and respectively fixed to inner circumferential surfaces and outer circumferential surfaces of the yokes 121, 123 and 124 with their polarities alternated with each other.

The stator 140 includes a fixed disk 151, armature metal cores 141 and 143, and armature coils 145, 147, 149 and 150. The fixed disk 151 is coupled to the rotating shaft 110 by a bearing 155. The armature metal cores are composed of the first armature metal core 141 and the second armature metal core 143. Grooves are formed in an outer side 141a and an inner side 141b of the first armature metal core 141 such that the armature coils 145 and 147 are wound thereon, respectively. Grooves are also formed in an outer side 143a and an inner side 143b of the second armature metal core 143 such that the armature coils 149 and 150 are wound thereon, respectively. One side of each armature metal core 141 or 143 is fixedly coupled to one surface of the fixed disk 151. The armature metal cores 141 and 143 are detachably fixed to the fixed disk 151 by means of bolts. Also, the armature coils are composed of the first armature coil 145, the second armature core 147, the third armature coil 149 and the fourth armature coil 150. The first armature coil 145 and the second armature coil 147 are wound on the outer side 141a and the inner side 141b of the first armature metal core 141. The third armature coil 149 and the fourth armature coil 150 are wound on the outer side 143a and the inner side 143b of the second armature metal core 143.

If power is supplied to the armature coils 145, 147, 149 and 150 of the motor, torque is generated to make the rotor 120 rotate. Thus, the rotating shaft 110 fixed to the rotor 120 rotates.

Figure 7:
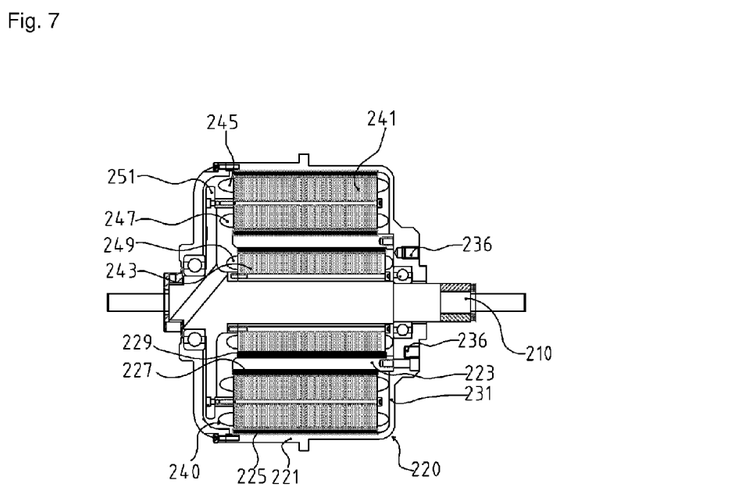
FIG. 7 is a side sectional view of a further embodiment of the motor having the yokes concentrically arranged according to the present invention.

FIG. 7 is a sectional view of a further embodiment of the motor having the yokes concentrically arranged according to the present invention.

The motor shown in FIG. 7 includes a fixed shaft 210, a rotor 220 and a stator 240, similarly to the motor of FIG. 1.

The rotor 220 includes yokes 221 and 223, magnets 225, 227 and 229, and a rotating disk 231. In the motor shown in FIG. 7, coupling holes 236 for coupling of a brake disk 255, which will be described below, are formed in one surface of the rotating disk 231, differently from the motor of FIG. 1. Thus, the brake disk 255 can be directly coupled to the rotating disk 231.

The stator 240 includes a fixed disk 251, armature metal cores 241 and 243, and armature coils 245, 247 and 249. In the motor shown in FIG. 1, the fixed disk 51 and the fixed shaft 10 are separately prepared, and then, the fixed disk 51 is fit around the fixed shaft 10 and fixedly coupled thereto. However, in the motor of FIG. 7, the fixed disk 251 and the fixed shaft 210 are formed integrally.

Figure 10:
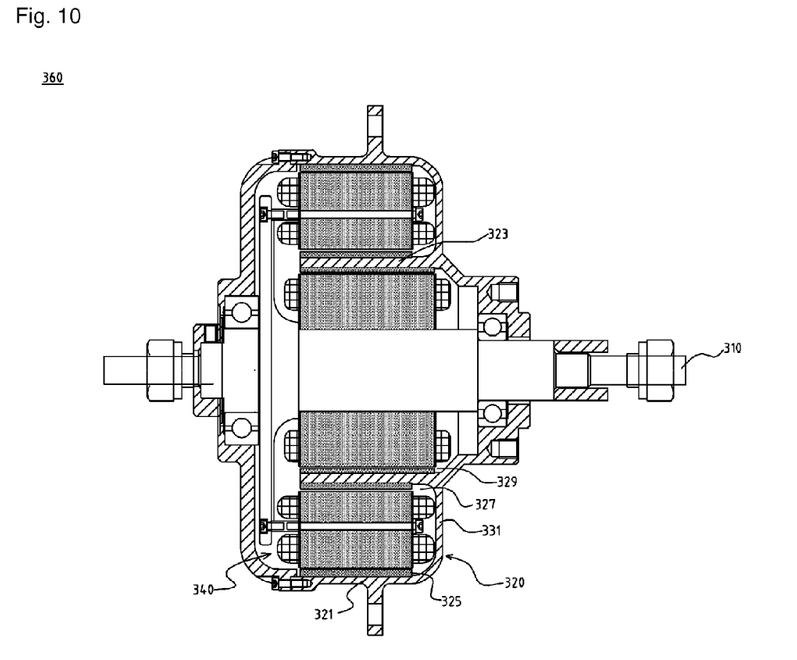
FIG. 10 is a side sectional view of a further embodiment of the motor having the yokes concentrically arranged according to the present invention.
Figure 11:
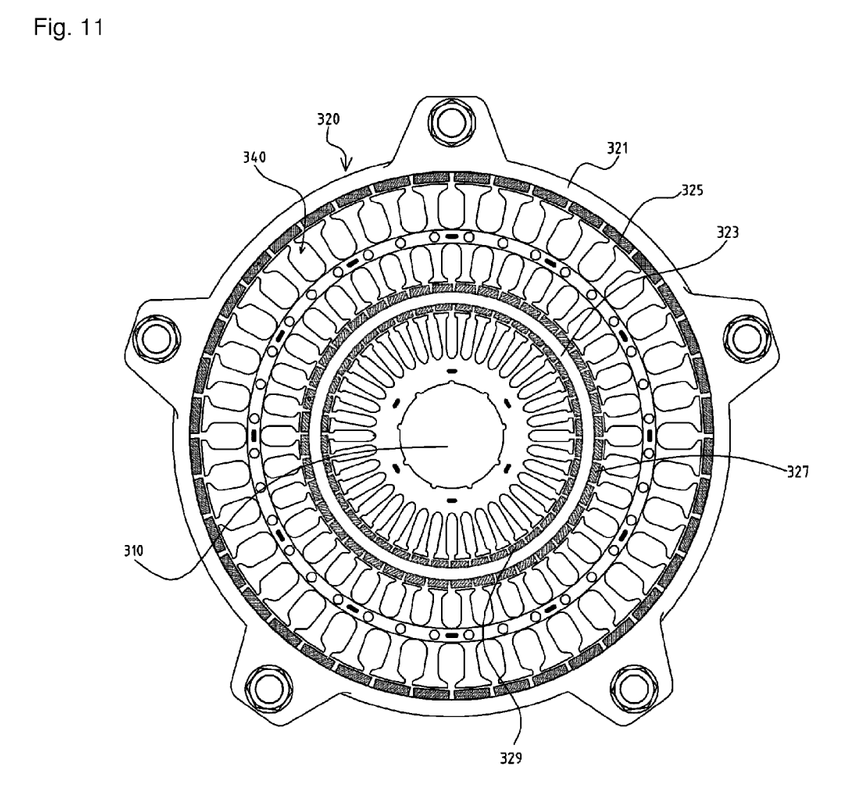
FIG. 11 is a front sectional view of the motor shown in FIG. 10.

FIG. 10 is a side sectional view of a further embodiment of the motor having the yokes concentrically arranged according to the present invention, and FIG. 11 is a front sectional view of the motor shown in FIG. 10.

A motor 360 of FIG. 10 includes a fixed shaft 310, a rotor 320 and a stator 340.

The rotor 320 includes yokes 321 and 323, a rotating disk 331, and magnets 325, 327 and 329. In the motor shown in FIG. 7, the yoke 223 is detachably coupled to the other surface of the rotating disk 231. However, in the motor of FIG. 10, the yokes 321 and 323 are formed by extending one surface of the rotating disk 331. Thus, the yokes 321 and 323 are formed integrally with the rotating disk 331. In a case where the yoke 223 and the rotating disk 231 are separately manufactured and assembled like the motor shown in FIG. 7, an assembling error may occur. Thus, in consideration of the assembling error, the motor is designed such that there is a sufficient gap between the yoke 223 and the armature metal cores 241 and 243. However, as the gaps between the magnets 225, 227 and 229 and the armature coils 245, 247 and 249 are increased, output power of the motor is decreased. In the motor shown in FIG. 10, all the yokes 321 and 323 are formed with integrally the rotating disk 331. Thus, since no assembling error occurs, it is possible to precisely narrow the gaps between the yokes 321 and 323 and the armature metal cores 341, 343. Thus, the motor of FIG. 10 can have enhanced output rather than the motor of FIG. 7.

Figure 14:
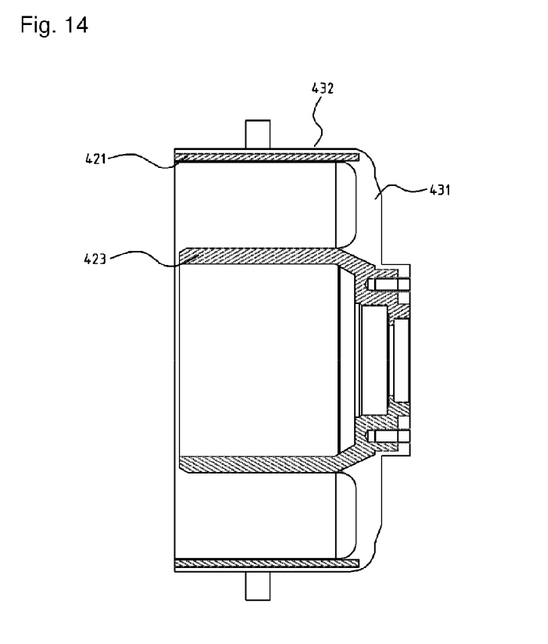
FIG. 14 is a sectional view of a rotor of a still further embodiment of the motor having the yokes concentrically arranged according to the present invention.

FIG. 14 is a sectional view of a rotor of a still further embodiment of the motor according to the present invention. In the embodiment shown in FIG. 10, the cylindrical yokes 321 and 323 are formed by extending one surface of the rotating disk 331. The yoke should be made of iron in order to define a magnetic path. Thus, in case of the embodiment shown in FIG. 10, since the rotating disk 331 and the cylindrical yokes 321 and 323 are integrally formed, they are all made of iron. In this case, the motor has a great weight. However, in the embodiment shown in FIG. 14, cylindrical yokes 421 and 423 are inserted into and fixed to one surface of a rotating disk 431. Thus, the cylindrical yokes 421 and 423 and the rotating disk 431 are separately formed. In this case, the cylindrical yokes 421 and 423 are made of cast iron, and the rotating disk 431 is made of aluminum or the like so as to decrease the weight of the motor. Also, in order to more securely fix the first yoke 421, a housing cylinder 432 is formed by extending a circumferential surface of the rotating disk 431 to surround the first yoke 421. That is, the cylindrical yokes 421 and 423 are formed of cast iron or the like. In addition, after the cylindrical yokes 421 and 423 are fixed, the rotating disk 431 and the housing cylinder 432 are formed by injection molding aluminum or the like. Then, it is possible to decrease the weight of the motor.

Figure 15:
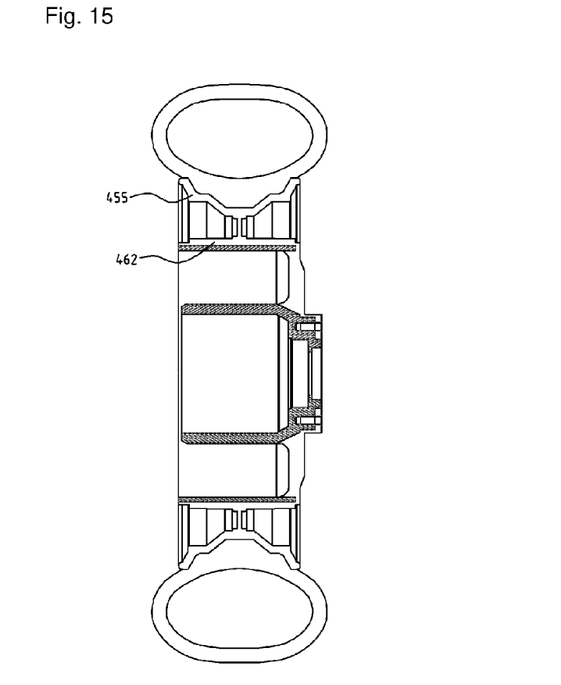
FIG. 15 is a sectional view of a rotor of a still further embodiment of the motor having the yokes concentrically arranged according to the present invention.

FIG. 15 is a sectional view of a rotor of a still further embodiment of the motor according to the present invention. The embodiment shown in FIG. 15 further includes a rim 455 extending from an outer circumferential surface of a housing cylinder 462, in comparison to the embodiment of FIG. 14. Thus, in case of the embodiment shown in FIG. 15, a tire can be directly mounted to an outer circumferential surface of the motor. Now, a driving apparatus having the motor according to another aspect of the present invention will be described.

Figure 3:
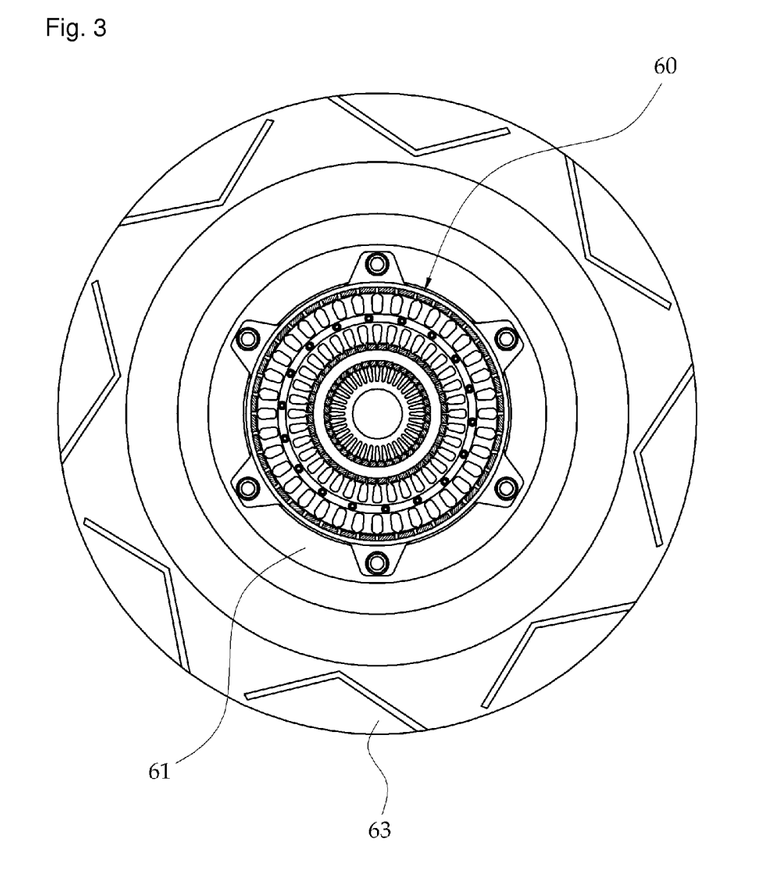
FIG. 3 is a front sectional view of a driving apparatus using the embodiment of the motor shown in FIG. 1.
Figure 4:
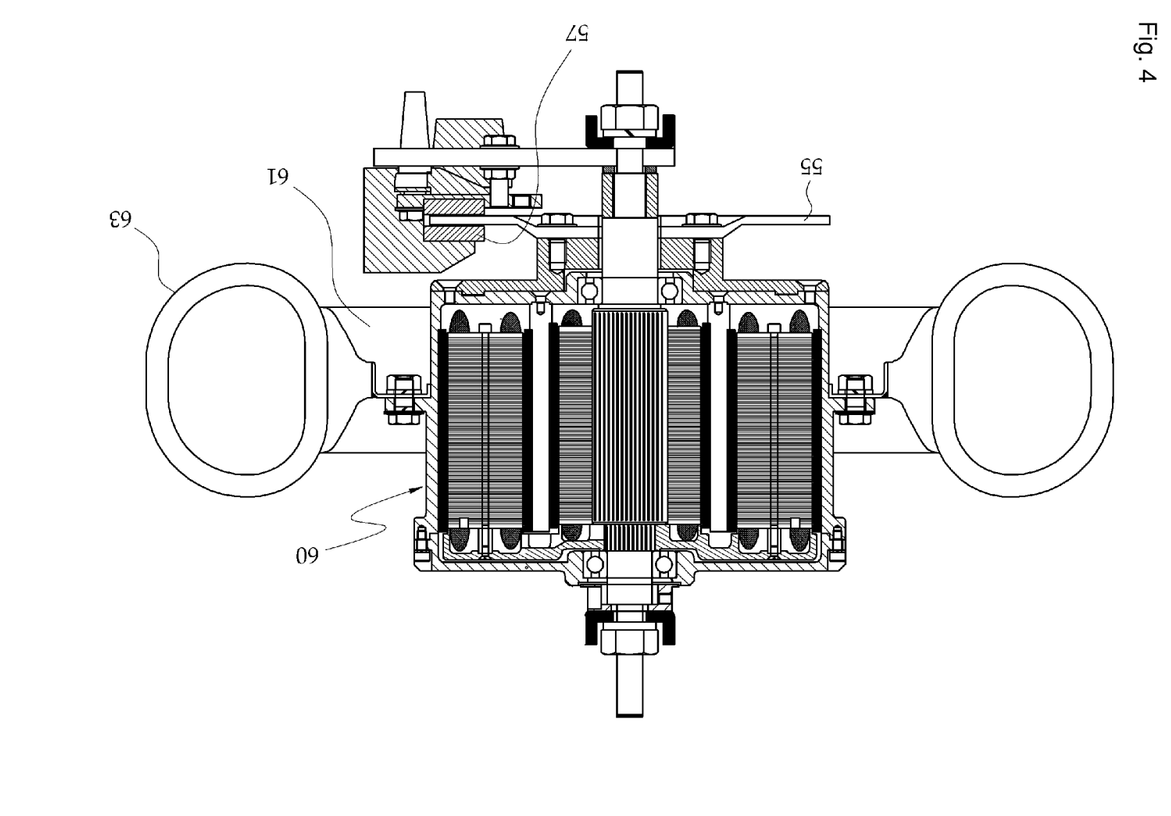
FIG. 4 is a side sectional view of the embodiment shown in FIG. 3.

FIG. 3 is a front sectional view of a driving apparatus using the embodiment of the motor shown in FIG. 1, and FIG. 4 is a side sectional view of the embodiment shown in FIG. 3.

The driving apparatus shown in FIGS. 3 and 4 includes the motor 60 shown in FIG. 1, a brake disk 55 and a caliper 57. The brake disk 55 is fixed to the other surface of the rotating disk 31 of the motor 60. In addition, the caliper 57 is installed to one side of the brake disk 55 and has one side fixed to the fixed shaft 10. If the rotor 20 of the motor 60 is fixed to a rim 61 of a tire 63 as shown in FIGS. 3 and 4, it may be used as a driving apparatus of an automobile, a vehicle or a motorcycle. Thus, if power is supplied to the armature coils 45, 47 and 49, the tire 63 is rotated due to the rotation of the rotor 20, and if the brake disk 55 is pressed using the caliper 57, the rotor 20 stops.

Figure 8:
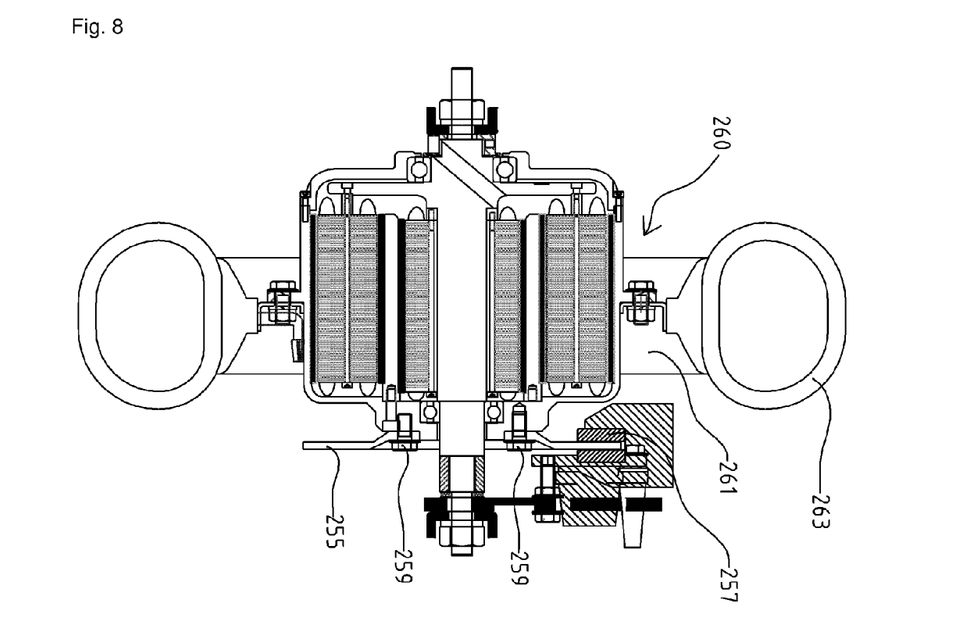
FIG. 8 is a side sectional view of a driving apparatus using the embodiment of the motor shown in FIG. 7.
Figure 9:
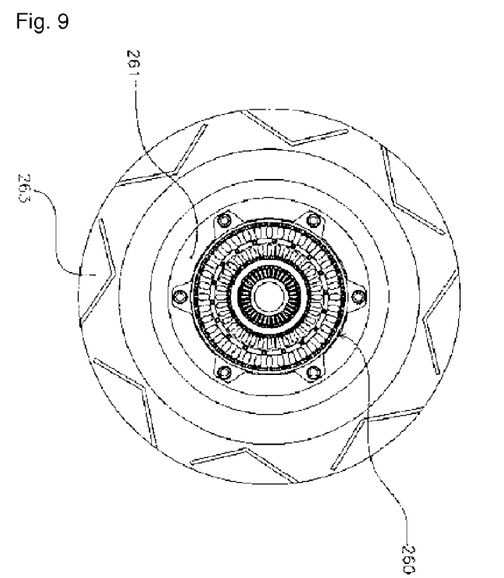
FIG. 9 is a front sectional view of the embodiment shown in FIG. 8.

FIG. 8 is a side sectional view of a driving apparatus using the embodiment of the motor shown in FIG. 7, and FIG. 9 is a front sectional view of the embodiment shown in FIG. 8.

The driving apparatus shown in FIG. 8 includes a motor 260 shown in FIG. 7, a brake disk 255 and a caliper 257. The brake disk 255 is fixed to one surface of the rotating disk 231 of the motor 260. The coupling holes 236 are formed in the surface of the rotating disk 231 such that bolts 259 can be coupled thereto. Thus, the brake disk 255 is detachably coupled to the surface of the rotating disk 231 by means of the bolts 259.

The caliper 257 is installed at one side of the brake disk 255 and has one side fixed to the fixed shaft 210.

Figure 12:
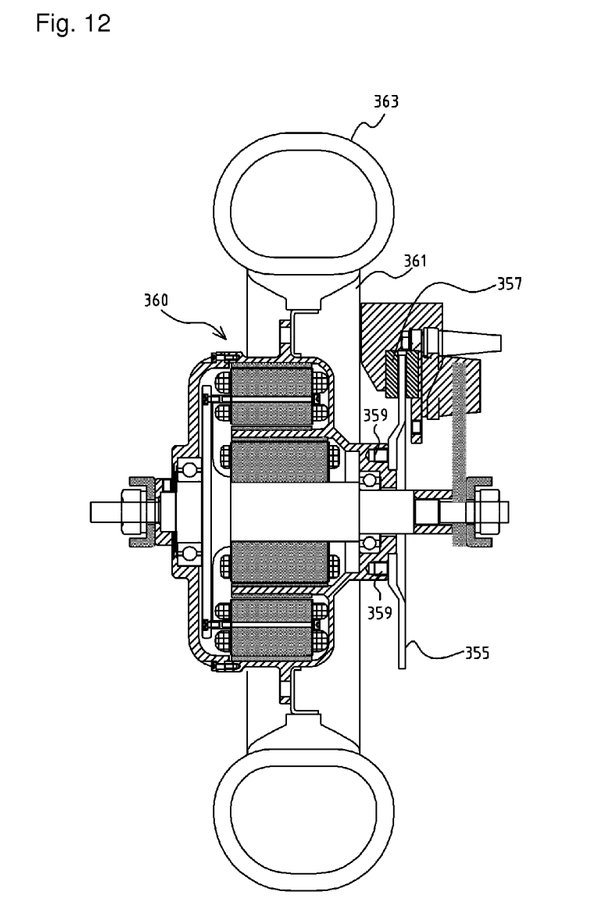
FIG. 12 is a side sectional view of a driving apparatus using the motor shown in FIG. 10.
Figure 13:
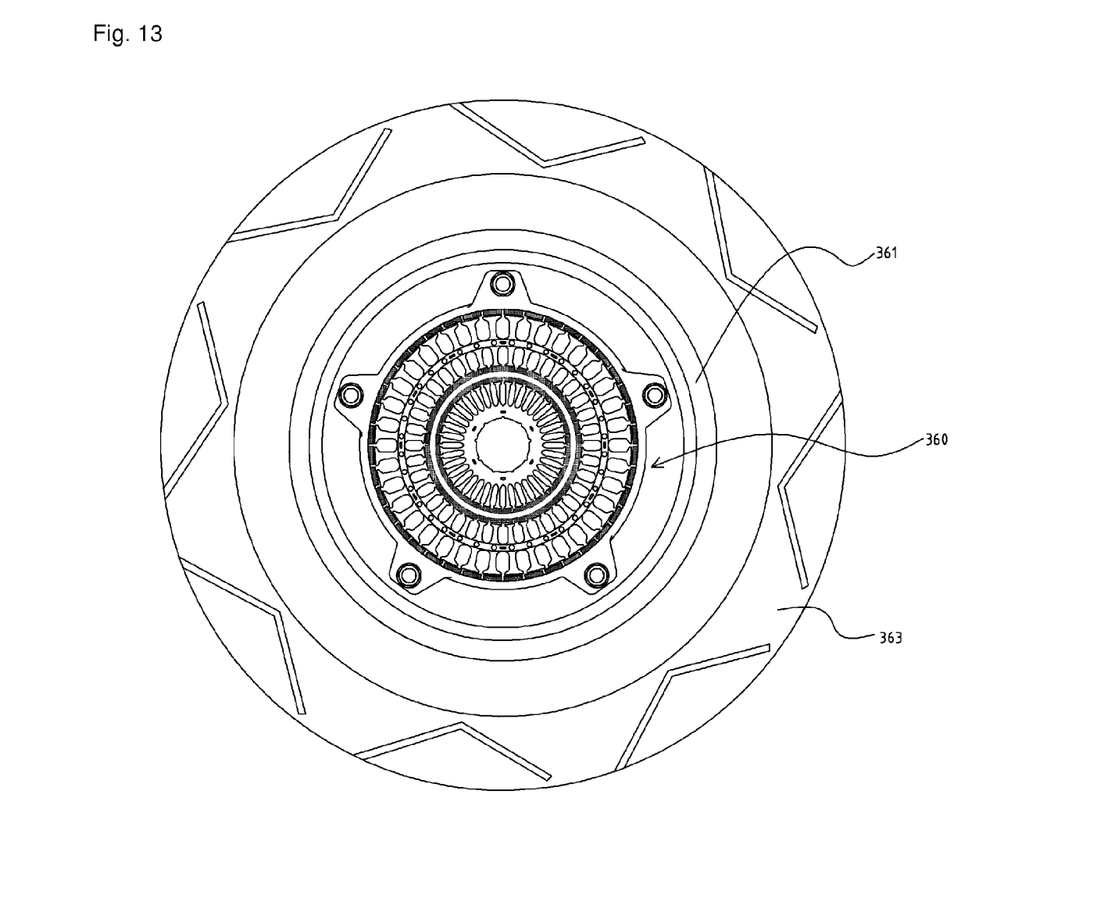
FIG. 13 is a front sectional view of the driving apparatus shown in FIG. 12.

FIG. 12 is a side sectional view of a driving apparatus using the motor shown in FIG. 10, and FIG. 13 is a front sectional view of the embodiment shown in FIG. 12.

The driving apparatus shown in FIG. 12 includes the motor 360 shown in FIG. 10, a brake disk 355 and a caliper 357. The brake disk 355 is fixed to the other surface of the rotating disk 331 of the motor 360. Coupling holes 336 are formed in the other surface of the rotating disk 331 such that bolts 359 can be coupled thereto. Thus, the brake disk 355 can be detachably coupled to the other surface of the rotating disk 331 by means of the bolts 359.

The caliper 357 is installed to one side of the brake disk 355 and has one side fixed to the fixed shaft 310.

INDUSTRIAL APPLICABILITY

According to the present invention, there is provided a motor having armature coils and magnets in multiple stages, so that the motor can have a small volume and generate a great torque.

In addition, according to the present invention, there is provided a motor, in which a brake disk can be directly coupled to a rotating disk, whereby it is possible to reduce the number of components of the motor and to shorten an assembling process.

Also, the present invention provides a motor, in which a rotating disk and yokes are formed integrally, so that it is possible to shorten an assembling process. Also, gaps between armature coils and magnets are reduced, whereby it is possible to enhance output power of the motor.

In addition, according to the present invention, there is provided a motor, in which a rotating disk is made of a lightweight material rather than yokes, so that it is possible to decrease the weight of the motor.

Further, the present invention provides a driving apparatus using the aforementioned motor, so that it is possible to implement an automobile, a vehicle or a motorcycle with excellent performance.

The embodiments explained above and illustrated in the drawings should not be interpreted as limiting the technical spirit of the present invention. The scope of the present invention should be defined only by the appended claims, and those skilled in the art can make various changes or modifications thereto. Therefore, such changes and modifications also pertain to the scope of the present invention if they are apparent to those skilled in the art.

The invention claimed is:

1. A motor having yokes concentrically arranged, comprising:
    a rotor having a plurality of cylindrical yokes arranged in multiple stages in a radial direction and a plurality of magnets respectively fixed to the yokes with polarities of the magnets alternated with each other in a circumferential direction of said yokes; and
    a stator having armature metal cores arranged to face the respective yokes and a plurality of armature coils wound on the armature cores to face the magnets;
    wherein the magnets are fixed to an outer and an inner circumferential surface of the yoke positioned between the armature metal cores and to an inner circumferential surface of the outermost yoke, and arranged to face each other in a radial direction,
    wherein the armature coils are wound on an outer and an inner side of the respective armature metal cores to face the magnets faced each other in a radial direction.

2. The motor as claimed in claim 1, further comprising a fixed shaft positioned at a rotation center of the rotor, wherein the rotor further has a rotating disk for rotatably coupling the respective yokes to the fixed shaft, and the stator further has a fixed disk for fixedly coupling the armature metal cores to the fixed shaft.

3. The motor as claimed in claim 2, wherein the armature metal cores positioned between the yokes is detachably coupled to the fixed disk.

4. The motor as claimed in claim 3, wherein the armature metal core positioned inside of the innermost yoke is fixedly coupled to the fixed shaft.

5. The motor as claimed in claim 3, wherein the yoke positioned between the armature metal cores is detachably coupled to the rotating disk.

6. A driving apparatus, comprising:
    the motor according to any one of claims 2 to 5;
    a brake disk fixedly coupled to the rotor of the motor; and
    a caliper installed to one side of the brake disk to restrain the brake disk from rotating.

7. The driving apparatus as claimed in claim 6, wherein the caliper is fixed to one side of the fixed shaft.

* * * * *